Dec. 29, 1931.  W. R. BANKSON  1,839,009
HEDGE TRIMMER
Filed Nov. 7, 1930
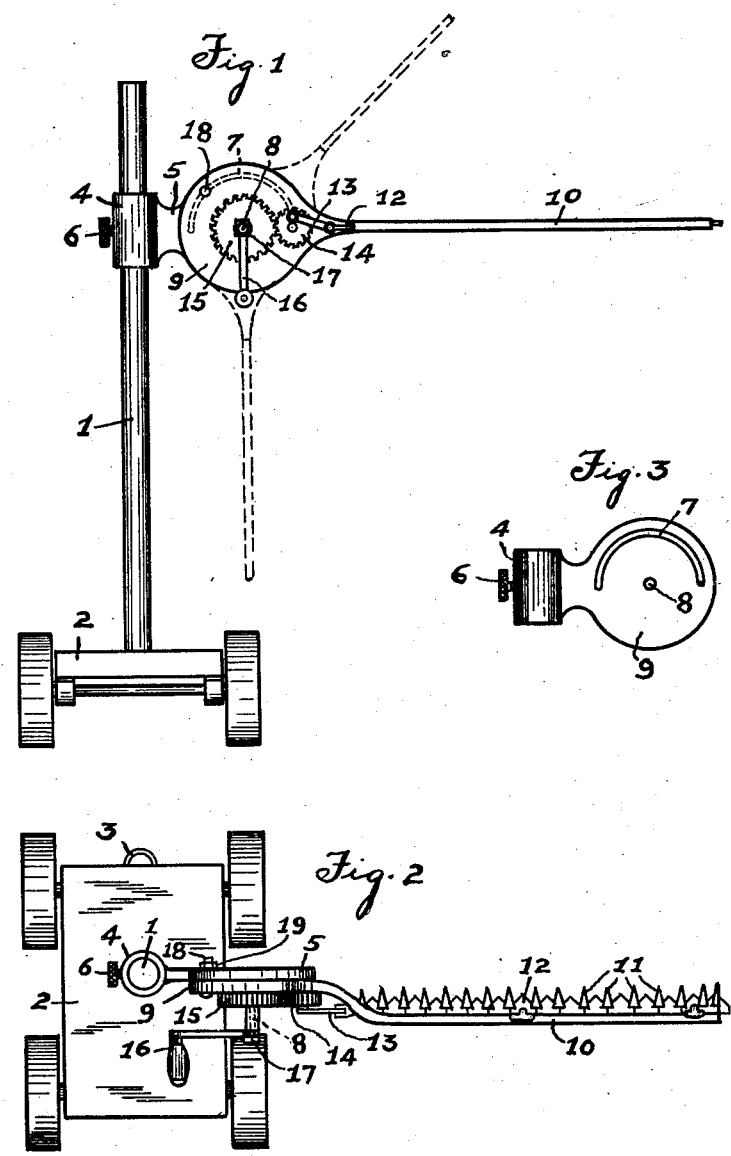

Patented Dec. 29, 1931

1,839,009

UNITED STATES PATENT OFFICE

WILLIAM R. BANKSON, OF PITTSBURGH, PENNSYLVANIA

HEDGE TRIMMER

Application filed November 7, 1930. Serial No. 494,092.

My invention relates to certain new and useful improvements in hedge trimmers, and important objects of the invention are to provide a hedge trimmer, of the character described, which will facilitate and expedite hedge trimming operations, which is simple in its construction and arrangement, durable and efficient in its use, and comparatively inexpensive to manufacture.

To the accomplishment of these and such other objects as may hereinafter appear, the invention consists of the novel construction, combination and arrangement of parts herein specifically described and illustrated in the accompanying drawings, but it is to be understood that changes, variations and modifications may be resorted to that come within the scope of the claims hereunto appended.

In the drawing wherein like numerals of reference designate corresponding parts throughout the several views:

Figure 1 is a rear elevational view of a hedge trimmer, constructed in accordance with the invention.

Figure 2 is a top plan view thereof.

Figure 3 is an inner side view of the supporting disk and of associated parts.

Referring in detail to the drawings 1 denotes a cylindrical, vertically disposed standard, which has its lower end rigidly secured to a low, small carriage truck 2. The forward end of the latter is provided with a staple 3 to permit of the connection of any suitable pulling element for conveying the device during hedge trimming operations.

A cylindrical adjusting sleeve 4, carrying a laterally disposed supporting disk 5, is slidably mounted for vertical adjustment on the standard 1. The adjusting sleeve 4 is provided with a locking screw 6 for securing the former in the adjusted position on the standard.

The upper portion of the supporting disk 5 is formed with an arcuate slot 7 having a uniform radial disposition from the axial center of the former, and extending one-half way around in the supporting disk 5. The supporting disk 5 is further provided with a rearwardly projecting fixed shaft 8, on which a connecting disk 9 is pivotally mounted.

The supporting disk 5 and the connecting disk 9 are preferably uniform in size and contour and disposed vertically edgewise, flatly against each other. The connecting disk 9 carries a side-projecting cutter bar 10, which is preferably formed integral therewith. The cutter bar 10 is of the well known construction including the slotted finger guards 11, through which the cutter member 12, having triangularly shaped knives, reciprocates in the usual manner.

Reciprocating movement is imparted to the cutter member 12, by a pitman 13, which has one end pivotally connected to the inner end of the cutter member 12. The other end of the pitman 13 is pivotally and eccentrically connected to a pinion 14, which is pivotally connected against the rear side of the connecting disk 9. The pinion 14 is driven by a driving gear 15, which is revolubly mounted on the fixed shaft 8 rearwardly of the supporting disk 5. The driving gear 15 carries a fixed crank 16, which, together with the said driving gear 15 are maintained on the shaft 8, by a nut 17 engaged on the rear end of the latter.

It is apparent that the manual operation of the crank 16 will drive the gear 15 and associated pinion 14 to provide the lateral reciprocation of the cutter member 12 in the cutter bar 10 to effect the cutting or trimming operation, in a manner well known in the art.

An adjusting bolt 18, having an associated nut 19, is fixed in the connecting disk 9 and projects forwardly through the arcuate slot 7 in the supporting disk 5. The bolt 18 and nut 19 are provided for fixedly securing the connecting disk 9 to the supporting disk 5 after the cutter bar 10 has been adjusted to the desired cutting position. The length of the arcuate slot 7 will allow the adjustment of the cutter bar 10 to the vertical position either above or below the connecting disk 9, or to any angular position between such vertical positions.

It will be noted that the vertical adjustment of the sleeve 4 on the standard 1 will elevate or lower the cutter bar 10 and associated parts to any position desired. Such adjustment, together with the angular adjustments of the cutter bar 10, in the manner stated, allows the positioning of the latter for any desired or required trimming operations.

During the operation of my improved hedge trimmer, it is, of course, necessary that the latter be moving or drawn forwardly by some suitable means, while the operator is operating the crank 16 to effect the cutting operation in the manner stated.

It is evident that the device may be operated and propelled by a suitable power mechanism instead of manually, as herein illustrated and described.

The present invention provides a most efficient device of its kind, which may be conveniently operated for neatly, quickly and accurately trimming a hedge along its top and along respective sides thereof.

What I claim is:

1. In combination, a hedge trimmer, of the character described, comprising a carriage truck, a vertical standard fixed on said carriage truck, a sleeve vertically adjustable on said standard, a supporting disk carried by said sleeve, a connecting disk mounted against said supporting disk, a cutter bar carried by said connecting disk, a cutter member mounted in said cutter bar, and means carried by said connecting disk and operable for imparting reciprocating movement to said cutter member in said cutter bar.

2. In combination, a hedge trimmer, of the character described, comprising a carriage truck, a vertical standard fixed on said carriage truck, a sleeve vertically adjustable on said standard, a supporting disk carried by said sleeve, a connecting disk mounted against said supporting disk, a cutter bar carried by said connecting disk, a cutter member mounted in said cutter bar, and means carried by said connecting disk and operable for imparting reciprocating movement to said cutter member in said cutter bar, said connecting disk being adjustable relatively to said supporting disk.

3. In combination, a hedge trimmer, of the character described, comprising a carriage truck, a vertically disposed standard fixed on said carriage truck, a sleeve mounted on said standard and being vertically adjustable on the latter, a laterally disposed supporting disk formed integral with said sleeve, a connecting disk mounted flatly against said supporting disk and pivotally adjustable relatively to the latter, a cutter bar being formed integral with said connecting disk, a cutter member mounted in said cutter bar, and an operating mechanism carried by said connecting disk for imparting reciprocating movement to said cutter member in said cutter bar, and means carried by said connecting disk and extending through said supporting disk for securing said connecting disk in the adjusted position.

In testimony whereof I affix my signature.

WILLIAM R. BANKSON.